US012678798B2

(12) United States Patent
Pan et al.

(10) Patent No.: US 12,678,798 B2
(45) Date of Patent: Jul. 14, 2026

(54) SAMPLE CRUSHER HAVING A CIRCUMFERENTIAL LIMITING COMPONENT AND A DAMPING MECHANISM

(71) Applicant: GUANGZHOU WONDFO BIOTECH CO., LTD., Guangzhou (CN)

(72) Inventors: Fengyang Pan, Guangzhou (CN); Zheng Xiong, Guangzhou (CN); Yuhao Hong, Guangzhou (CN)

(73) Assignee: GUANGZHOU WONDFO BIOTECH CO., LTD., Guangzhou (CN)

( * ) Notice: Subject to any disclaimer, the term of this patent is extended or adjusted under 35 U.S.C. 154(b) by 715 days.

(21) Appl. No.: 18/248,731

(22) PCT Filed: Nov. 26, 2020

(86) PCT No.: PCT/CN2020/131628
§ 371 (c)(1),
(2) Date: Apr. 12, 2023

(87) PCT Pub. No.: WO2022/082925
PCT Pub. Date: Apr. 28, 2022

(65) Prior Publication Data
US 2023/0415163 A1 Dec. 28, 2023

(30) Foreign Application Priority Data
Oct. 23, 2020 (CN) .......................... 202022396735.4

(51) Int. Cl.
*B02C 17/10* (2006.01)
*B01F 31/20* (2022.01)
(Continued)

(52) U.S. Cl.
CPC .............. *B02C 17/10* (2013.01); *B01F 31/25* (2022.01); *B01F 31/26* (2022.01); *B02C 17/24* (2013.01); *G01N 1/28* (2013.01)

(58) Field of Classification Search
CPC .......... B01F 31/20; B01F 31/25; B01F 31/26; B02C 17/10; B02C 17/24; B02C 17/14;
(Continued)

(56) References Cited

U.S. PATENT DOCUMENTS 3,985,307 A * 10/1976 Ebbert .................... B01F 29/10
241/199.5
4,125,335 A * 11/1978 Blume .................... B01F 31/26
366/209
(Continued)

FOREIGN PATENT DOCUMENTS

CN 101063078 A * 10/2007 ............. B08B 3/044
CN 108535466 A 9/2018
(Continued)

OTHER PUBLICATIONS

International Search Report and Written Opinion issued on Jul. 22, 2021, in corresponding International Application No. PCT/CN2020/131628, 13 pages.

*Primary Examiner* — Charles Cooley
(74) *Attorney, Agent, or Firm* — Maier & Maier, PLLC

(57) ABSTRACT

A sample crusher, including a main body housing and an electric motor arranged in the main body housing. A swing mechanism is further arranged in the main body housing. The swing mechanism includes a transmission shaft, a swing disk for allowing a grinding tube to be placed thereon, and a circumferential limiting component. The transmission shaft is driven by the electric motor to rotate, an obliquely arranged bearing is sleeved on the transmission shaft, an included angle is formed between an axis of the bearing and an axis of the transmission shaft, the swing disk is mounted
(Continued)

on the bearing, the swing disk and the bearing are concentrically arranged, and the swing disk is connected to the circumferential limiting component.

16 Claims, 7 Drawing Sheets

(51) Int. Cl.
    *B01F 31/25*      (2022.01)
    *B02C 17/24*     (2006.01)
    *G01N 1/28*      (2006.01)

(58) Field of Classification Search
    CPC ... G01N 1/28; G01N 2001/2866; G01N 1/286
    USPC ................................................. 366/215–217
    See application file for complete search history.

(56) References Cited

U.S. PATENT DOCUMENTS

| | | | | |
|---|---|---|---|---|
| 4,619,532 A * | 10/1986 | Schmidt, III | ......... | B01F 31/265 |
| | | | | D15/147 |
| 4,702,610 A * | 10/1987 | Reynolds, Jr. | ........ | B01F 35/422 |
| | | | | 366/208 |
| 5,567,050 A * | 10/1996 | Zlobinsky | ............. | B01F 31/201 |
| | | | | 366/209 |
| 5,921,676 A * | 7/1999 | Reynolds | ............... | C12M 27/16 |
| | | | | 366/208 |
| 6,602,178 B2 * | 8/2003 | Inaniwa | ................... | B04B 7/06 |
| | | | | 494/12 |
| 7,059,762 B2 * | 6/2006 | Yi | ........................... | B01F 31/20 |
| | | | | 366/208 |
| 7,188,993 B1 * | 3/2007 | Howe | .................... | B06B 1/161 |
| | | | | 366/128 |
| 7,448,789 B2 * | 11/2008 | Boquet | ................... | B01F 31/26 |
| | | | | 366/209 |
| 2003/0201562 A1 * | 10/2003 | Lease | ...................... | B01F 29/60 |
| | | | | 425/456 |
| 2004/0132082 A1 * | 7/2004 | Gautsch | ............. | C12N 15/1003 |
| | | | | 435/270 |
| 2004/0151064 A1 * | 8/2004 | Yi | ........................... | B01F 31/20 |
| | | | | 366/209 |
| 2007/0064521 A1 * | 3/2007 | Miszenti | ................ | B01F 31/26 |
| | | | | 366/208 |
| 2007/0154125 A1 * | 7/2007 | Boquet | ................... | F16C 19/55 |
| | | | | 384/496 |
| 2015/0146496 A1 * | 5/2015 | Lucon | ........................ | B01J 2/18 |
| | | | | 366/111 |
| 2020/0108363 A1 * | 4/2020 | Riback | ................ | B01F 35/3204 |
| 2023/0415163 A1 * | 12/2023 | Pan | ........................ | G01N 1/286 |

FOREIGN PATENT DOCUMENTS

| | | | | |
|---|---|---|---|---|
| CN | 108844793 A | 11/2018 | | |
| CN | 109794327 A | 5/2019 | | |
| CN | 209418332 U | 9/2019 | | |
| CN | 209470953 U | 10/2019 | | |
| CN | 110548582 A | 12/2019 | | |
| CN | 110859499 A | 3/2020 | | |
| FR | 2879110 A1 * | 6/2006 | ............. | B01F 35/30 |
| JP | 2017176135 A | 10/2017 | | |
| WO | WO-2006008397 A1 * | 1/2006 | ............. | F16C 19/55 |
| WO | WO-2014033564 A1 * | 3/2014 | ........... | B01F 35/531 |

* cited by examiner

53

51

521

54

52

SAMPLE CRUSHER HAVING A CIRCUMFERENTIAL LIMITING COMPONENT AND A DAMPING MECHANISM

The present application claims priority to International Patent Application No. PCT/CN2020/131628 filed on Nov. 26, 2020 which claims priority to Chinese Patent Application No. 202022396735.4, filed with the China National Intellectual Property Administration on Oct. 23, 2020, which is incorporated herein by reference in its entirety.

TECHNICAL FIELD

The present application belongs to the technical field of test devices, and particularly relates to a sample crusher.

BACKGROUND

At present, most drugs are excreted through urination. Usually, it is only necessary to collect urine of a subject as a specimen to be tested, and the way of using the urine as a test sample is low in cost and simple in operation, but it has certain privacy and the possibility of fraud. In addition, the urine sample can only reflect drug abuse of a drug abuser in recent days, and must be collected in a timely manner. Moreover, blood is also a commonly used drug test sample which contains high concentrations of drugs and metabolites, so blood is an ideal material. However, the blood can only reflect drug abuse in recent days or even several hours. If the blood contains infectious disease viruses, sampling is dangerous. Furthermore, saliva, which is also frequently used as a sample for drug testing, is convenient to collect, and a collection device is simple and easy to purify. However, as a sample, the saliva has a short testing time window, is prone to contamination, and has low test sensitivity to some drugs.

Hair samples can overcome the defects of many liquid samples: first, they can be stored simply at normal temperature in dark for several years; second, drug abuse in the last several months or even in the last six months is traceable; and third, the test materials are simple to take and difficult to adulterate.

When the hair is used as a test sample for testing and analysis, it is necessary to first treat the test sample, such as by grinding and crushing, to extract components of the sample before testing. With regard to a gold standard test method for hair samples, an LC-MS/MS test method is currently the commonly used method accepted by the administration of justice and the labor market. A main process of the method includes the steps of washing, drying, grinding, ultrasonic dissolution, extraction, machine operation, etc. The operation process of the method is extremely complex, requiring a large-scale liquid chromatography-mass spectrometry instrument, a large site, and professional personnel. The results come out slowly, and the method is incapable of carrying out rapid analysis and instant testing on test samples after crushing treatment, and is therefore not suitable for streamlined operations.

SUMMARY

An objective of the present application is to provide a sample crusher, which enables a sample treated by the sample crusher to be used for instant testing, has an effectively shortened test time and an increased test rate of test samples, allows for easy testing and analysis of the test sample, and can meet screening requirements and facilitate widespread use.

A technical solution thereof is as follows:

a sample crusher, comprising a main body housing and an electric motor arranged in the main body housing, a swing mechanism being further arranged in the main body housing, wherein the swing mechanism comprises a transmission shaft, a swing disk for allowing a grinding tube to be placed thereon, and a circumferential limiting component; and the transmission shaft is driven by the electric motor to rotate, an obliquely arranged bearing is sleeved on the transmission shaft, an included angle is formed between an axis of the bearing and an axis of the transmission shaft, the swing disk is mounted on the bearing, the swing disk and the bearing are concentrically arranged, and the swing disk is connected to the circumferential limiting component.

In an embodiment, the sample crusher further comprises a damping mechanism arranged in the main body housing, wherein the damping mechanism comprises a supporting plate, a first spring set and a second spring set; the electric motor is mounted on the supporting plate; the first spring set is located between the bottom of the supporting plate and the bottom of the main body housing and is capable of providing an upward elastic force to the supporting plate; and the second spring set is connected to the first spring set and is capable of providing a downward elastic force to the supporting plate.

In an embodiment, the first spring set has an elastic coefficient greater than that of the second spring set, the elastic coefficient of the first spring set is 0.6-1.5 kgf/mm, and the elastic coefficient of the second spring set is 0.03-0.2 Kgf/mm.

In an embodiment, the damping mechanism further comprises a support body; the support body comprises a first connecting portion passing through the supporting plate and connected to the first spring set, and an acting portion at the end away from the first spring set; the acting portion extends beyond the supporting plate; the second spring set is sleeved on the support body; and the second spring set is connected to the acting portion at one end, and is connected to the supporting plate at the other end.

In an embodiment, a connecting plate is arranged at the end of the first spring set close to the supporting plate, a second connecting portion is arranged in the middle of the connecting plate and is internally provided with an internal thread, the first connecting portion of the support body is provided with an external thread adapted to the second connecting portion, and the support body is threadedly connected to the connecting plate.

In an embodiment, the circumferential limiting component comprises a mounting portion and a plurality of limiting portions, the mounting portion is integrally formed with the plurality of limiting portions, the circumferential limiting component is mounted on the electric motor by means of the mounting portion, and each of the plurality of limiting portions is connected to the swing disk.

In an embodiment, the mounting portion is arranged in the form of a ring, each of the plurality of limiting portions is bar-shaped, and each of the plurality of limiting portions is integrally connected to an edge of the mounting portion, and is arranged along the edge of the mounting portion and extends radially toward the outside.

In an embodiment, the end of the limiting portion connected to the swing disk has a width greater than that of the portion of the limiting portion extending along the edge of the mounting portion.

In an embodiment, a first connecting lug and a second connecting lug are arranged on the end of the limiting portion connected to the swing disk, and the first connecting lug and the second connecting lug respectively extend toward two sides of the limiting portion.

In an embodiment, a first connecting hole is formed in the mounting portion, a second connecting hole is formed in the first connecting lug, the first connecting hole is arranged flush with the second connecting hole in an extending direction of the limiting portion, a distance between the first connecting hole and the second connecting hole is in a range of 65-85 mm, and an included angle of 5° to 9° is formed between the axis of the bearing and the axis of the transmission shaft.

In an embodiment, a first connecting hole is formed in the mounting portion, a second connecting hole is formed in the first connecting lug, the first connecting hole is arranged flush with the second connecting hole in an extending direction of the limiting portion, a distance between the first connecting hole and the second connecting hole is in a range of 80-105 mm, and an included angle of 16° to 25° is formed between the axis of the bearing and the axis of the transmission shaft.

In an embodiment, the plurality of limiting portions comprise at least a first limiting portion, a second limiting portion and a third limiting portion which are all arranged at the edge of the mounting portion.

In an embodiment, an included angle of 115° to 120° is formed between two adjacent limiting portions.

In an embodiment, the circumferential limiting component is made of a flexible material, the swing disk is located above the electric motor, the end of the limiting portion close to the mounting portion is configured to be bent upwardly, and the end of the limiting portion connected to the swing disk is configured to be bent inwardly toward the side close to the swing disk.

In an embodiment, the sample crusher further comprises a main body upper cover, wherein a lock-catch switch is arranged between the main body upper cover and the main body housing, and is connected to a control circuit of the electric motor.

In an embodiment, the lock-catch switch comprises a lock structure and a catch structure adapted to the lock structure, the lock structure is mounted on the main body housing, the catch structure is mounted on the main body upper cover at a position corresponding to the lock structure, the lock structure is provided with a first contact point in communication with the control circuit, and the catch structure is provided with a second contact point in communication with the control circuit.

In an embodiment, the sample crusher further comprises a main body upper cover, wherein a contact switch is arranged between the main body upper cover and the main body housing, and is in communication with a control circuit of the electric motor.

In an embodiment, the contact switch is mounted on an inner side of the main body upper cover, and a trigger block is arranged in the main body housing at a position corresponding to the contact switch, or the contact switch is mounted on an inner side of the main body housing, and a trigger block is arranged in the main body upper cover at a position corresponding to the contact switch.

According to the sample crusher provided by the present application, by sleeving the obliquely arranged bearing on the transmission shaft, mounting the swing disk on the bearing and concentrically arranging the swing disk and the bearing, when the electric motor drives the transmission shaft to rotate, the bearing is driven to rotate synchronously, the swing disk swings up and down while the circumferential limiting component limits a circumferential rotation of the swing disk, grinding beads in the grinding tube placed on the swing disk rapidly grind a test sample, and a screening result can be displayed while instantly testing a liquid mixture of the ground test sample. The sample crusher can effectively increase the analysis rate of test samples, make a test operation easier, easily test and analyze the test samples, meet screening requirements, and facilitate popularization and widespread use.

LIST OF REFERENCE SIGNS

Figure 1:
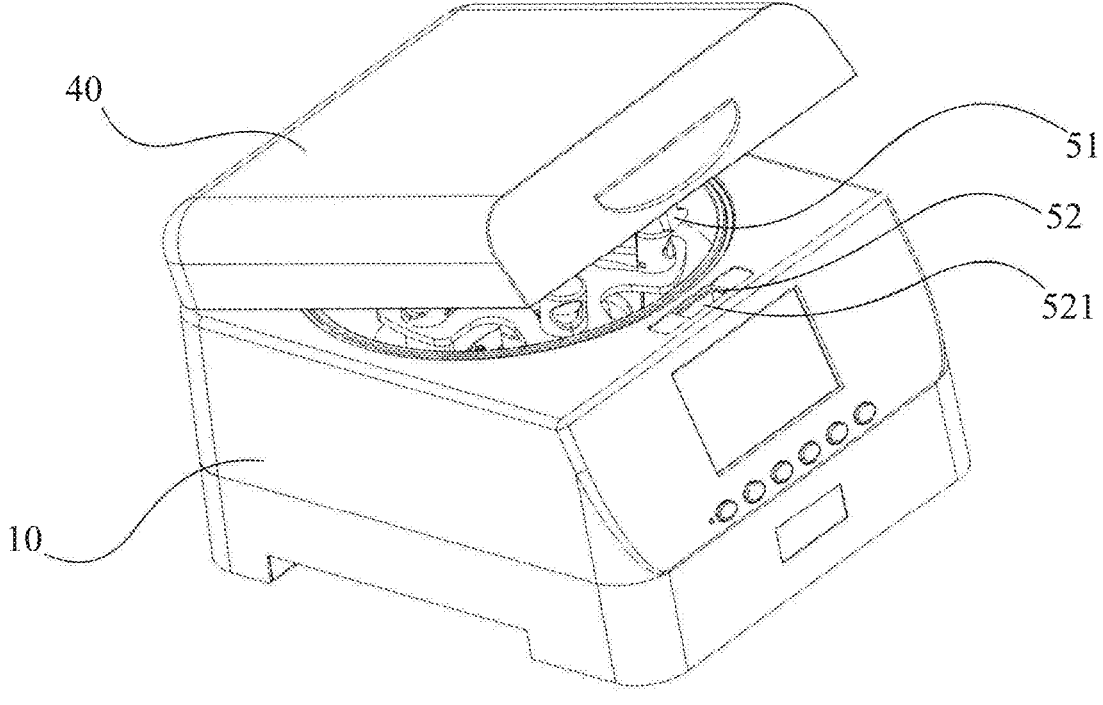
FIG. 1 is a schematic diagram of an overall structure of a sample crusher according to an embodiment of the present application.

10. Main body housing; 11. Electric motor; 20. Transmission shaft; 21. Swing disk; 22. Circumferential limiting component; 221. Mounting portion; 222. First limiting portion; 223. Second limiting portion; 224. Third limiting portion; 225. First connecting lug; 226. Second connecting lug; 227. First connecting hole; 228. Second connecting hole; 23. Bearing; 30. Damping mechanism; 31. First spring set; 311. Connecting plate; 312. Second connecting portion; 32. Second spring set; 33. Supporting plate; 34. Support body; 341. First connecting portion; 342. Acting portion; 343. Smooth rod portion; 35. Flexible gasket; 40. Main body upper cover; 50. Lock-catch switch; 51. Catch body; 52. Lock body; 521. Receiving cavity; 53. First mounting plate; 54. Second mounting plate; 60. Bolt; 70. Movable connector; 71. First connecting side; 72. Second connecting side.

DETAILED DESCRIPTION

For ease of understanding the present application, specific embodiments of the present application will be described in detail with reference to the accompanying drawings.

Unless specifically stated or otherwise defined, all technical and scientific terms used herein have the same meanings as those commonly understood by those skilled in the art to which the present application belongs. In the case of combining the technical solution of the present application with a real scene, all the technical and scientific terms used herein may also have the meanings corresponding to the purpose of achieving the technical solution of the present application.

Unless specifically stated or otherwise defined, the terms "first, second, . . . " used herein are merely intended to distinguish names and do not represent the specific number or order.

Unless specifically stated or otherwise defined, the term "and/or" used herein includes any and all combinations of one or more related listed items.

It should be noted that when an element is said to be "fixed to" another element, it may be directly fixed to the other element or an intervening element may be present. When an element is said to be "connected" to another element, it may be directly connected to the other element or an intervening element may be also present. When an element is said to be "mounted on" another element, it may be directly mounted on the other element or an intervening element may be also present. When an element is said to be "arranged at" another element, it may be directly arranged at the other element or an intervening element may be also present.

Unless specifically stated or otherwise defined, the term "said" or "the" used herein refers to the technical feature or technical content that is previously mentioned or described in a corresponding position, and the technical feature or technical content may be the same as or similar to the technical feature or technical content referred to.

Undoubtedly, the technical contents or technical features that are contrary to the purpose of the present application or are obviously contradictory should be excluded.

Figure 2:
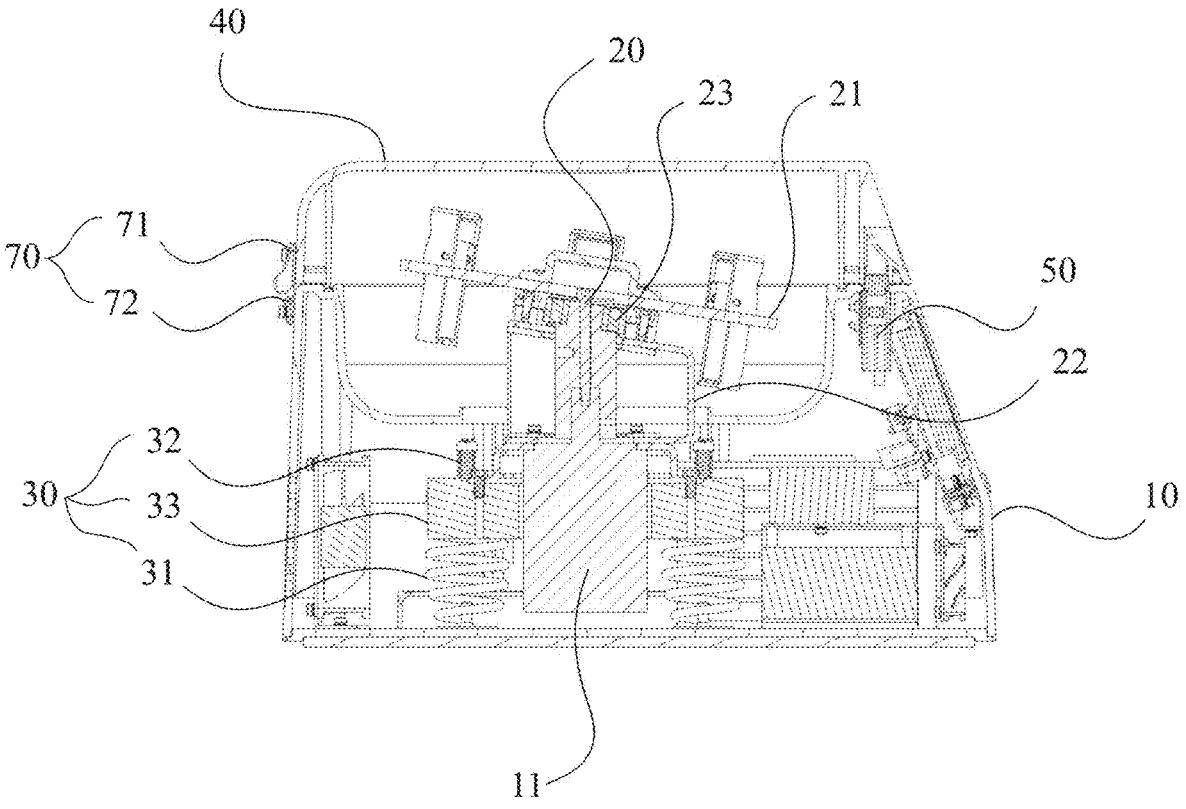
FIG. 2 is a cross-sectional view of a structure of an electric motor of a sample crusher according to an embodiment of the present application.
Figure 3:
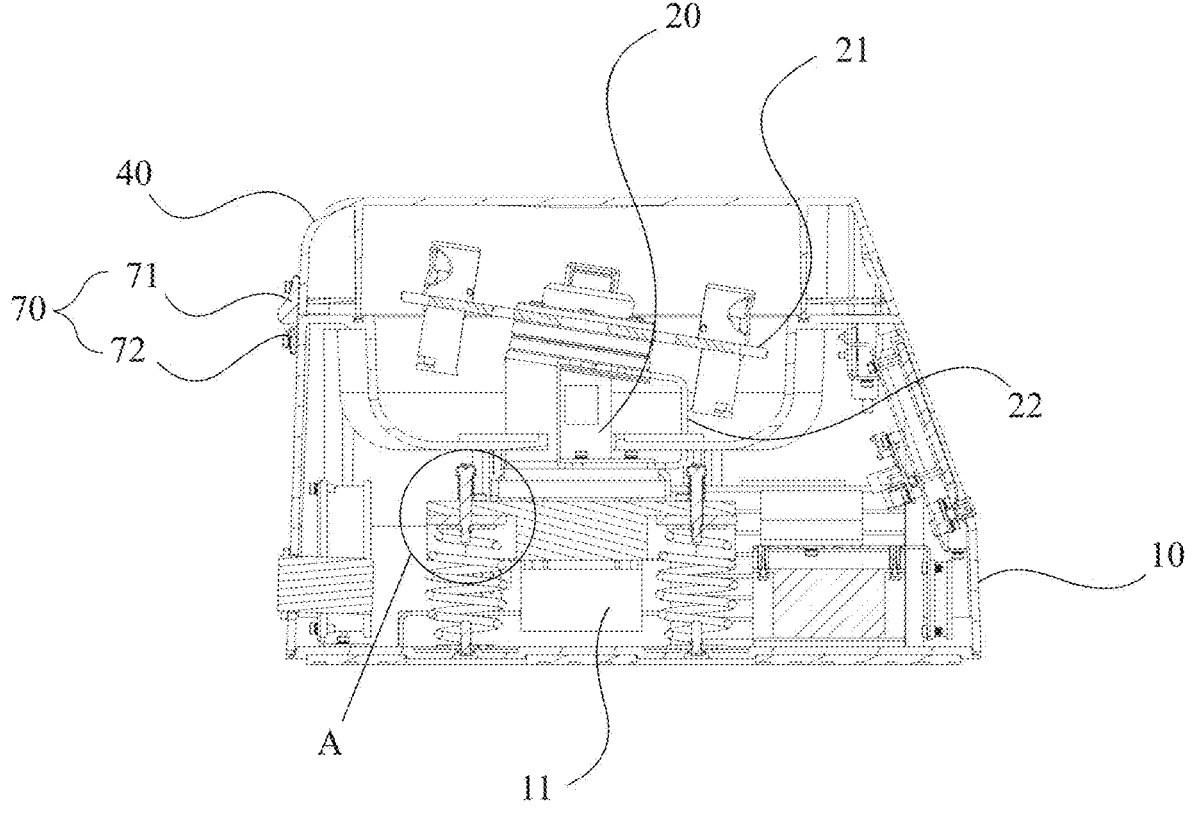
FIG. 3 is a cross-sectional view of a damping mechanism of a sample crusher according to an embodiment of the present application.
Figure 4:
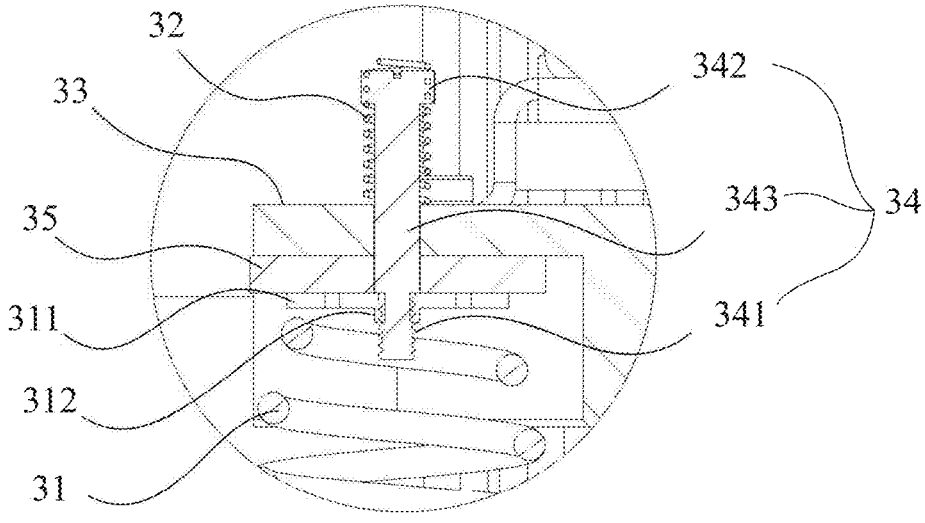
FIG. 4 is an enlarged schematic view of part A in FIG. 3.

As shown in FIGS. 1-3, a sample crusher comprises a main body housing 10 made of a plastic material and an electric motor 11 mounted in the main body housing 10. A swing mechanism is further arranged in the main body housing 10. The swing mechanism comprises a transmission shaft 20, a swing disk 21 for allowing a grinding tube to be placed thereon, and a circumferential limiting component 22. The transmission shaft 20 is driven by the electric motor 11 to rotate, an obliquely arranged bearing 23 is sleeved on the transmission shaft 20, and an included angle of 3° to 25° is formed between an axis of the bearing 23 and an axis of the transmission shaft 20. In this embodiment, an included angle of 5° to 9° (or 16° to 25°) may be selected. The swing disk 21 is mounted on the bearing 23, the swing disk 21 and the bearing 23 are concentrically arranged, and the swing disk 21 is connected to the circumferential limiting component 22. By means of the above arrangement, when the electric motor 11 drives the transmission shaft 20 to rotate, the bearing 23 is driven to rotate synchronously, and the bearing 23 drives the swing disk 21 to swing up and down while the circumferential limiting component 22 limits a circumferential rotation of the swing disk 21. Grinding beads in the grinding tube placed on the swing disk 21 perform rapid grinding on a test sample, and after grinding and crushing treatment, a liquid mixture of the test sample in the grinding tube can be tested by using a colloidal gold method, an immunofluorescence method, a chemilumines- cence immunoassay method, etc., and a screening result can then be displayed. By using the sample crusher, the analysis rate of test samples can be effectively increased, a test duration can be shortened, a test operation is easier than other test sample testing methods, the test samples (bone, keratin or hair, etc.) are easy to test and analyze, the cost of a single test is lower, the screening requirements can be met, and widespread use is facilitated.

As shown in FIGS. 2-5, the sample crusher provided by the present application further comprises a damping mecha- nism 30 arranged in the main body housing 10. The damping mechanism 30 comprises a supporting plate 33, a first spring set 31 and a second spring set 32. The electric motor 11 is mounted on the supporting plate 33, the first spring set 31 is located between the bottom of the supporting plate 33 and the bottom of the main body housing 10 and can provide an upward elastic force to the supporting plate 33, and the second spring set 32 is connected to the first spring set 31 and can provide a downward elastic force to the supporting plate 33. The first spring set 31 has an elastic coefficient greater than that of the second spring set 32, the elastic coefficient of the first spring set 31 is in a range of 0.6-1.5 kgf/mm, and the elastic coefficient of the second spring set 32 is in a range of 0.03-0.2 Kgf/mm. At a starting moment of the crusher, a deflection vibration is serious, the support- ing plate 33 is partially tilted upwardly, and the second spring set 32 provides the downward elastic force to the supporting plate 33 and does work on the supporting plate 33, reducing a vibration intensity at the starting moment of the crusher. When the crusher operates smoothly, the first spring set 31 provides the upward elastic force to the supporting plate 33 and does work on the supporting plate 33, reducing the vibration intensity when the crusher oper- ates smoothly. The first spring set 31 and the second spring set 32 are arranged on the supporting plate 33, and the first spring set 31 and the second spring set 32 are adapted to a change in the center of gravity of the crusher, so that the vibration and displacement of the crusher are avoided, and noise generated during the vibration of the crusher is also avoided. In addition, the arrangement of the first spring set 31 and the second spring set 32 can greatly decrease the weight of the supporting plate 33, and accordingly the effect of decreasing the weight of the crusher is achieved.

The damping mechanism 30 further comprises a support body 34. In this embodiment, the support body 34 is in the shape of a rod, and the support body 34 comprises a first connecting portion 341 passing through the supporting plate 33 and connected to the first spring set 31, and an acting portion 342 at the end away from the first spring set 31. The acting portion 342 extends beyond the supporting plate 33, the acting portion 342 is an acting block fixed to the support body 34, the second spring set 32 is sleeved on the support body 34, and the second spring set 32 is connected to the acting portion 342 at one end, and is connected to or abuts against an upper surface of the supporting plate 33 at the other end. By means of the above arrangement, the second spring set 32 is arranged at the upper surface of the sup- porting plate 33 and can accordingly provide the downward elastic force to the supporting plate 33. At the starting moment of the crusher, the second spring set 32 is com- pressed between the supporting plate 33 and the acting portion 342 of the support body 34 to provide the downward elastic force to the supporting plate 33 and to do work on the supporting plate 33, so that the second spring set 32 can adapt to the change in the center of gravity of the crusher at the starting moment.

A connecting plate 311 is fixed at the end of the first spring set 31 close to the supporting plate 33, the connecting plate 311 and the first spring set 31 may be of an integrally formed structure, a second connecting portion 312 is arranged in the middle of the connecting plate 311, the second connecting portion 312 is internally provided with an internal thread, the first connecting portion 341 of the support body 34 is provided with an external thread adapted to the second connecting portion 312, and the support body 34 is threadedly connected to the connecting plate 311. By means of the threaded connection between the support body 34 and the connecting plate 311, the support body 34 is convenient to mount and dismount. In this embodiment, the second connecting portion 312 extends and protrudes toward the side of the connecting plate 311 away from the supporting plate 33, the internal thread is configured to extend toward the protruding side of the second connecting portion 312, and the first connecting portion 341 has a length greater than that of the second connecting portion 312. When the first connecting portion 341 and the second connecting portion 312 are fully connected to each other, the first connecting portion 341 extends beyond the second connecting portion 312, so that the reliability of connection between the support body 34 and the first spring set 31 can be improved.

The support body 34 is further provided with a smooth rod portion 343. The smooth rod portion 343 is located between the first connecting portion 341 and the acting portion 342, and there is a gap between the smooth rod portion 343 and the supporting plate 33. The middle portion of the support body 34 which passes through the supporting plate 33 and connected to the first spring set 31 is the smooth rod portion 343, the arrangement of the smooth rod portion 343 facilitates the movement of the support body 34 in the supporting plate 33, and the gap between the smooth rod portion 343 and the supporting plate 33 prevents the smooth rod portion 343 from directly abutting against the supporting plate 33, so that the support body 34 is prevented from generating a frictional force during the movement, and the movement of the support body 34 is facilitated.

The smooth rod portion 343 has a diameter greater than that of the first connecting portion 341, and when the first connecting portion 341 and the second connecting portion 312 are fully connected to each other, the end of the smooth rod portion 343 close to the connecting plate 311 abuts against the connecting plate 311 and is fastened to the connecting plate 311, and the connection strength between the support body 34 and the first spring set 31 is then increased, so that the support body 34 is less likely to be disconnected from the first spring set 31 during the vibration of the crusher.

A flexible gasket 35 is arranged between the supporting plate 33 and the first spring set 31, and the support body 34 passes through the flexible gasket 35 and is connected to the connecting plate 311 of the first spring. The arrangement of the flexible gasket 35 allows transition from rigid abutment to flexible abutment between the supporting plate 33 and the connecting plate 311, and thus facilitates the reduction of abrasion between the supporting plate 33 and the connecting plate 311 while reducing noise caused by collision between the supporting plate 33 and the connecting plate 311 during the starting of the crusher.

The flexible gasket 35 is made of a silica gel material, and there is a gap between the smooth rod portion 343 of the support body 34 and the flexible gasket 35. By means of the above arrangement, the support body 34 is prevent from abutting against the flexible gasket 35 during the movement, so that the generation of frictional force is avoided during the movement of the support body 34, and the movement of the support body 34 is then facilitated.

Figure 5:
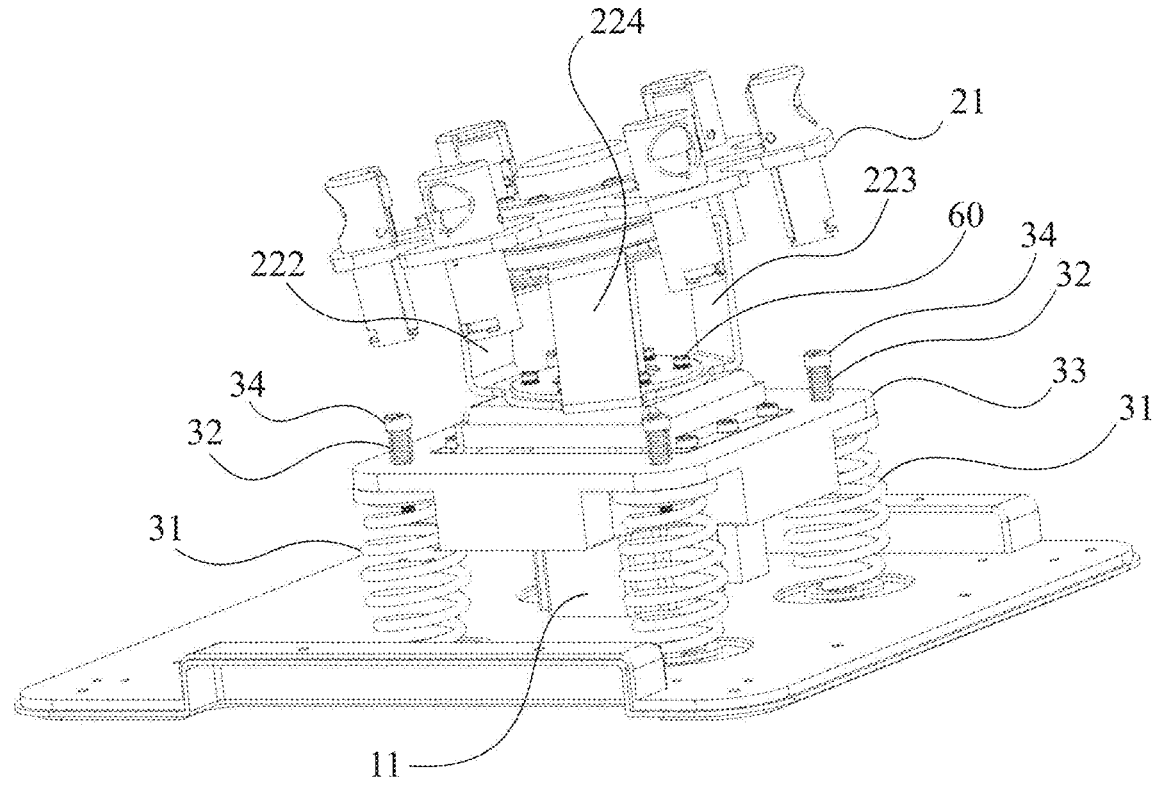
FIG. 5 is a schematic diagram of an internal structure of a sample crusher according to an embodiment of the present application.

As shown in FIG. 5, in this embodiment, the supporting plate 33 has four corners, four first spring sets 31 and four second spring sets 32 are provided, the four first spring sets 31 are respectively mounted to the four corners of the supporting plate 33, and the four second spring sets 32 are arranged corresponding to the first spring sets 31 on a one-to-one basis. By arranging the first spring sets 31 and the second spring sets 32 in the above manner, the supporting plate 33 is more uniformly subjected to the elastic forces of both the spring sets, and a damping effect of the crusher is further improved.

Figure 6:
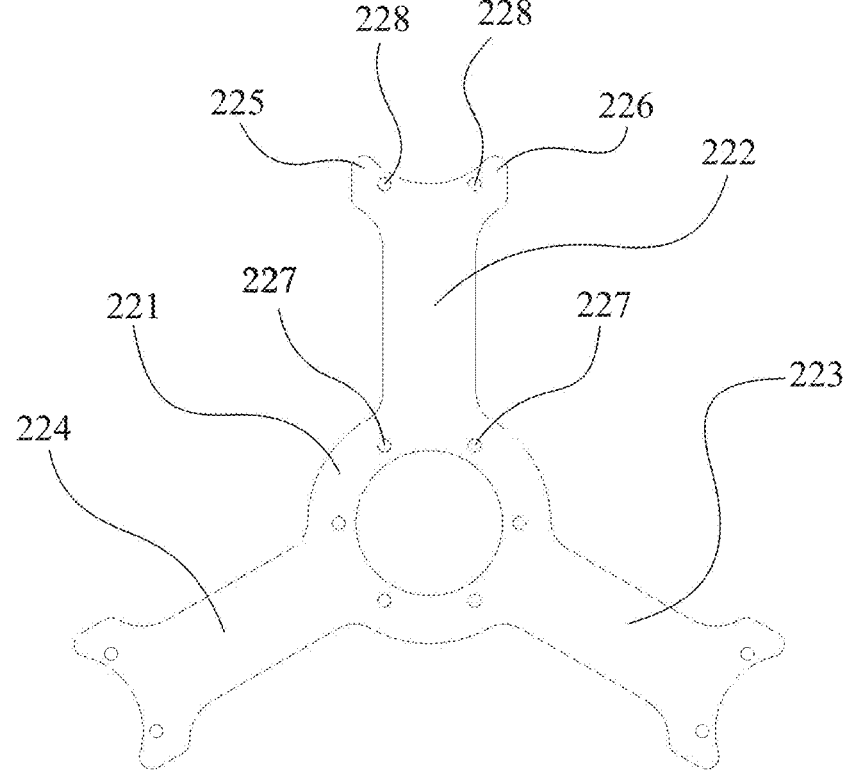
FIG. 6 is a schematic structural diagram of a circumferential limiting component in a sample crusher according to an embodiment of the present application.

As shown in FIG. 6, the circumferential limiting component 22 comprises a mounting portion 221 and a plurality of limiting portions, the mounting portion 221 is integrally formed with the plurality of limiting portions, the circumferential limiting component 22 is mounted on the electric motor 11 by means of the mounting portion 221, and each of the plurality of limiting portions is connected to the swing disk 21. By arranging the plurality of limiting portions, multi-point limiting is achieved, and the limiting effect of the circumferential limiting component 22 on the swing disk 21 is improved, so that the swing disk 21 is effectively prevented from being prone to rotation due to the influence of the rotation of the transmission shaft, and the influence on a reciprocating swing motion of the swing disk 21 is then avoided. The integral formation of the mounting portion 221 and the plurality of limiting portions facilitates the increase of the overall toughness of the circumferential limiting component 22, so that the circumferential limiting component 22 is less likely to break when the swing disk 21 is pulled to rotate.

The mounting portion 221 is arranged in the form of a ring, each of the plurality of limiting portions is bar-shaped, and each of the plurality of limiting portions is integrally connected to an edge of the mounting portion 221, and is arranged along the edge of the mounting portion 221 and extends radially toward the outside. The bottom of the swing disk 21 is mounted and connected to the bearing 23, and each of the plurality of limiting portions is connected to the bottom of the swing disk 21. The mounting portion 221 arranged in the form of a ring is sleeved on the transmission shaft 20 and is then fixedly mounted on a housing of the electric motor 11 by means of a bolt, the end of each of the plurality of limiting portions connected to the swing disk 21 is connected to the bottom of the swing disk 21 by means of a bolt, the mounting of the circumferential limiting component 22 is then completed, and an internal space of the crusher can be saved in the above mounting manner.

The end of the limiting portion connected to the swing disk 21 has a width greater than that of the portion of the limiting portion extending along the edge of the mounting portion 221. By increasing the width of the end of the limiting portion connected to the swing disk 21, a contact area between the limiting portion and the swing disk 21 is increased, which facilitates the increase of the limiting strength of the circumferential limiting component 22 on the swing disk 21.

The end of the limiting portion away from the mounting portion 221 is provided with an arc-shaped notch bent inwardly toward the end close to the mounting portion 221. In this embodiment, the bottom of the swing disk 21 is in a cylindrical shape, and the notch is configured to be in an arc shape corresponding to a side wall of the bottom of the swing disk 21, so that the limiting portion is attached to or close to the side wall of the swing disk 21 and is then connected to the swing disk 21, which facilitates the mounting of the circumferential limiting component while increasing the limiting strength of the circumferential limiting component on the swing disk 21.

A first connecting lug 225 and a second connecting lug 226 are arranged on the end of the limiting portion connected to the swing disk 21, and the first connecting lug 225 and the second connecting lug 226 respectively extend toward two sides of the limiting portion. The arrangement of the two connecting lugs facilitates the increase of the connection strength between the limiting portion and the swing disk 21 and therefore the increase of a degree of stress between the limiting portion and the swing disk 21, and also facilitates the increase of the limiting strength of the circumferential limiting component 22 on the swing disk 21.

The mounting portion 221 of the circumferential limiting component 22 is provided with first connecting holes 227, bolts 60 pass through the first connecting holes 227 to connect and fix the mounting portion 221 to the electric motor 11, the connecting lugs are provided with second connecting holes 228, and bolts 60 pass through the second connecting holes 228 to connect and fix the connecting lugs to the swing disk 21. Each first connecting hole 227 is arranged flush with the respective second connecting hole 228 in extending direction of the respective limiting portion, and a distance between the first connecting hole 227 and the second connecting hole 228 is in a range of 65-105 mm, namely, the effective size range of the circumferential limiting component 22 is 65-105 mm. By rationally designing the positions of the connecting holes, the circumferential limiting component 22 can effectively limit the rotation of the swing disk 21. In an embodiment, when an included angle of 5° to 9° is formed between the axis of the bearing and the axis of the transmission shaft, the effective size range of the circumferential limiting component is selected to be 65-85 mm. In another embodiment, when an included angle of 16° to 25° is formed between the axis of the bearing and the axis of the transmission shaft, the effective size range of the circumferential limiting component is selected to be 80-105 mm. By matching the effective size of the circumferential limiting component with the included angle formed between the axis of the bearing and the axis of the transmission shaft in the above two embodiments, the crusher can achieve a better effect in operation.

It should be noted that a controller (not shown) is further arranged in the main body housing and configured to control parameters such as a rotation speed and a frequency of the electric motor. Programs in the controller are set with different parameters for the circumferential limiting components of different sizes, and specific parameter ranges are as follows. The rotation speed is 2,800-3,200 rpm; and a crushing time is 20-40 seconds, and the number of crushing cycles is 3-8.

In this embodiment, three limiting portions are provided, comprising a first limiting portion 222, a second limiting portion 223 and a third limiting portion 224. The first limiting portion 222, the second limiting portion 223 and the third limiting portion 224 are all arranged at the edge of the mounting portion 221. By arranging the three limiting portions, three limiting points are formed for the swing disk 21, and the limiting strength of the circumferential limiting component 22 on the swing disk 21 is increased, so that the swing disk 21 is less likely to be affected by the rotation of the bearing 23, and normal swing of the swing disk 21 is facilitated.

An included angle of 120° is formed between two adjacent limiting portions. Stresses between the three limiting portions of the circumferential limiting component 22 and the swing disk 21 are uniform, the limiting strength of the circumferential limiting component 22 on the swing disk 21 is further increased, and the circumferential limiting component 22 is also less likely to break due to non-uniform local stresses, which facilitates the prolonging of the service life of the circumferential limiting component 22.

The circumferential limiting component 22 is made of a flexible material, the swing disk 21 is located above the electric motor 11, the end of the limiting portion close to the mounting portion 221 is configured to be bent upwardly, and the end of the limiting portion connected to the swing disk 21 is configured to be bent inwardly toward the side close to the swing disk 21. By means of the above arrangement, it is avoided that the circumferential limiting component 22 affects the normal movement of the swing disk 21, and normal grinding of the test sample is facilitated.

Figure 7:
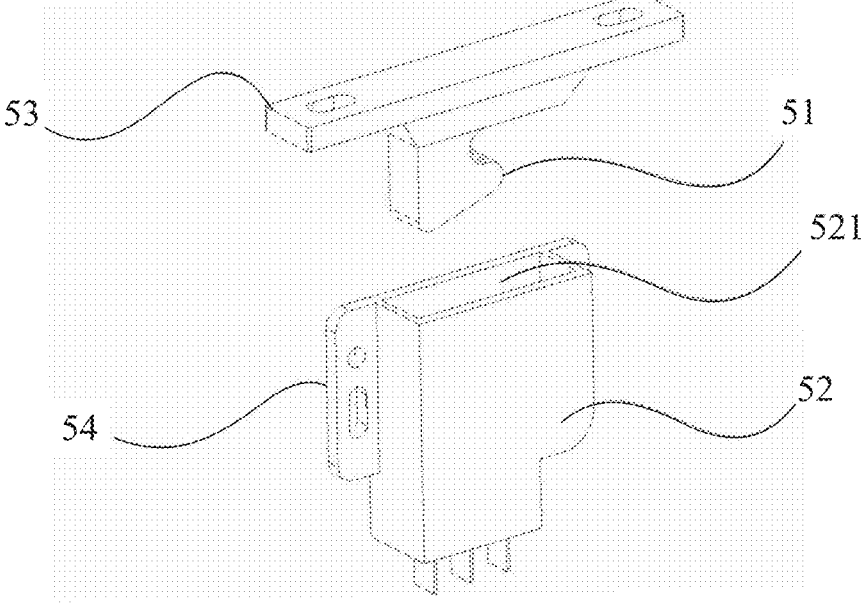
FIG. 7 is a schematic structural diagram of a lock-catch switch in a sample crusher according to an embodiment of the present application.

As shown in FIGS. 1 and 7, the sample crusher provided by the present application further comprises a main body upper cover 40 connected to the main body housing 10. A lock-catch switch 50 is arranged between the main body upper cover 40 and the main body housing 10, and the lock-catch switch 50 is connected to a control circuit of the electric motor 11. By means of the above arrangement, when the main body upper cover is closed, the lock-catch switch 50 can achieve a locking function of the crusher, avoid the direct exposure of the swing mechanism, prevent the damage to a user who otherwise accidentally touches the swing mechanism, and can protect the internal structure of the crusher. In addition, ON/OFF of the control circuit of the electric motor 11 can also be controlled, the control circuit is in a disconnected state when the lock-catch switch 50 is turned on; and the control circuit is in a connected state when the lock-catch switch 50 is turned off, so that when the cover of the crusher is opened, a protective effect is provided, avoiding accidents such as electric shock, and a safety factor of the crusher is thus improved.

The lock-catch switch 50 comprises a lock structure and a catch structure adapted to the lock structure. The lock structure is mounted on the main body housing 10, the catch structure is mounted on the main body upper cover 40 at a position corresponding to the lock structure, the lock structure is provided with a first contact point (not shown) in communication with the control circuit, and the catch structure is provided with a second contact point (not shown) in communication with the control circuit. By means of the above arrangement, when the main body upper cover 40 is closed, the locking structure cooperates with the catch structure to lock the main body upper cover 40, and the first contact point is in communication with the second contact point to achieve connection of the control circuit. When the main body upper cover 40 is opened, the lock structure is separated from the catch structure, and the first contact point is disconnected from the second contact point to achieve disconnection of the control circuit, thereby achieving protective effect during cover opening.

As shown in FIG. 7, the catch structure comprises a first mounting plate 53 and a catch body 51. The first contact point is located on the catch body 51, one side of the first mounting plate 53 is fixedly connected to the catch body 51, and the side of the first mounting plate 53 away from the catch body 51 is connected to the main body upper cover 40. The lock structure comprises a second mounting plate 54 and a lock body 52. The second contact point is located on the lock body 52, one side of the second mounting plate 54 is connected to the lock body 52, and the side of the second mounting plate 54 away from the lock body 52 is connected to the main body housing 10. The catch body 51 is mounted to the main body upper cover 40 by means of the first mounting plate 53, the lock body 52 is mounted to the main body housing 10 by means of the second mounting plate 54, so that the mounting of the lock-catch switch 50 is achieved.

The lock body 52 is provided with a receiving cavity 521 for receiving the catch body 51, and the side of the receiving cavity 521 close to the catch body 51 is configured to be open. When the main body upper cover 40 is closed, the catch body 51 is inserted into the receiving cavity 521 of the lock body 52 to prevent the catch body 51 and the lock body 52 from being directly exposed, and to prevent short circuiting caused by contact with the internal structure of the crusher, thereby providing a protection function.

In an embodiment, the lock-catch switch 50 is replaced by a contact switch (not shown) which is arranged between the main body upper cover 40 and the main body housing 10. The contact switch is connected to the control circuit of the electric motor 11. When the main body upper cover 40 is closed, the contact switch is turned on and connected to the control circuit, and the electric motor can be started normally. When the main body upper cover 40 is opened, the contact switch is turned off, causing the control circuit to be disconnected, the electric motor to be powered off, and the swing mechanism to stop swinging, and accordingly a power-off protection function of the crusher cover opening is achieved.

The contact switch is mounted on an inner side of the main body upper cover and a first trigger block (not shown) is mounted in the main body housing 10 at a position corresponding to the contact switch. When the main body upper cover 40 is closed, the first trigger block abuts against the contact switch and activates the contact switch to make the control circuit connected, and the electric motor 11 can be started normally. When the main body upper cover 40 is opened, the first trigger block is separated from the contact switch, the contact switch is simultaneously turned off, and the control circuit is disconnected, so that the protection function is achieved during cover opening.

It should be noted that mounting positions of the contact switch and the trigger block can be adjusted according to actual requirements. In an embodiment, the contact switch is mounted on the inner side of the main body housing 10, and a second trigger block is mounted in the main body upper cover 40 at a position corresponding to the contact switch, with the second trigger block having the same function as the first trigger block.

It should also be noted that using the lock-catch switch 50 is an optional embodiment of the present application. In addition to the lock-catch switch 50 and the contact switch, a magnetic control manner or the like may be used to achieve the power-off protection function of the crusher during cover opening.

A movable connector 70 is further mounted between the main body upper cover 40 and the main body housing 10. The movable connector 70 comprises a first connecting side 71 and a second connecting side 72. The first connecting side 71 is articulated to the second connecting side 72, the first connecting side 71 is connected to an outer wall of the main body upper cover 40, the second connecting side 72 is connected to an outer wall of the main body housing, and the movable connector 70 is located at the end of the main body housing 10 away from the lock-catch switch 50. By means of the above arrangement, the articulation between the main body upper cover 40 and the main body housing 10 is achieved, so that an operation of closing or opening the main body upper cover 40 is more convenient.

The sample crusher provided by the present application can rapidly analyze the test sample, enables a convenient test operation, has a lower cost for a single test, can meet the screening requirements, and can be widely used. The first spring set 31 and the second spring set 32 are adapted to the change in the center of gravity of the crusher, so that the vibration and displacement of the crusher are avoided, and the noise generated during the vibration of the crusher is also avoided. The circumferential limiting component 22 provided with the plurality of limiting portions improves the limiting effect of the circumferential limiting component 22 on the swing disk 21, prevents the swing disk 21 from rotating more effectively, and avoids the influence on the reciprocating swing motion of the swing disk 21. By arranging the lock-catch switch 50, not only a locking function of the main body upper cover 40 of the crusher can be achieved, but also the protection function can be achieved during cover opening by controlling the connection/disconnection of the control circuit of the electric motor 11.

A hair sample is mixed with a sample pretreatment reagent and grinding beads, etc. for testing the hair sample, and the mixture is subjected to shaking and crushing with the sample crusher described in the present application to obtain a liquid to be tested. The liquid to be tested is tested by using a colloidal gold method, an immunofluorescence method, a chemiluminescence immunoassay method, etc. so as to obtain a test result.

What is claimed is:

1. A sample crusher, comprising:
a main body housing;
an electric motor arranged in the main body housing; and
a swing mechanism arranged in the main body housing, wherein the swing mechanism comprises a transmission shaft, a swing disk for allowing a grinding tube to be placed thereon, and a circumferential limiting component, and the transmission shaft is driven by the electric motor to rotate, an obliquely arranged bearing is sleeved on the transmission shaft, an included angle is formed between an axis of the bearing and an axis of the transmission shaft, the swing disk is mounted on the bearing, the swing disk and the bearing are concentrically arranged, and the swing disk is connected to the circumferential limiting component,
wherein the circumferential limiting component comprises a mounting portion and a plurality of limiting portions, the mounting portion is integrally formed with the plurality of limiting portions, the circumferential limiting component is mounted on the electric motor by means of the mounting portion, and each of the plurality of limiting portions is connected to the swing disk,
and wherein the mounting portion is arranged in the form of a ring, each of the plurality of limiting portions is bar-shaped, and each of the plurality of limiting portions is integrally connected to an edge of the mounting portion, and is arranged along the edge of the mounting portion and extends radially toward the outside.

2. The sample crusher according to claim 1, further comprising a damping mechanism arranged in the main body housing, wherein the damping mechanism comprises a supporting plate, a first spring set and a second spring set; the electric motor is mounted on the supporting plate; the first spring set is located between a bottom of the supporting plate and a bottom of the main body housing and is capable of providing an upward elastic force to the supporting plate; and the second spring set is connected to the first spring set and is capable of providing a downward elastic force to the supporting plate.

3. The sample crusher according to claim 2, wherein the first spring set has an elastic coefficient greater than that of the second spring set, the elastic coefficient of the first spring set is 0.6-1.5 kgf/mm, and the elastic coefficient of the second spring set is 0.03-0.2 kgf/mm.

4. The sample crusher according to claim 2, wherein the damping mechanism further comprises a support body; the support body comprises a first connecting portion passing through the supporting plate and connected to the first spring set, and an acting portion at an end away from the first spring set; the acting portion extends beyond the supporting plate; the second spring set is sleeved on the support body; and the second spring set is connected to the acting portion at one end, and is connected to the supporting plate at the other end.

5. The sample crusher according to claim 4, wherein a connecting plate is arranged at the end of the first spring set close to the supporting plate, a second connecting portion is arranged in the middle of the connecting plate and is internally provided with an internal thread, the first connecting portion of the support body is provided with an external thread adapted to the second connecting portion, and the support body is threadedly connected to the connecting plate.

6. The sample crusher according to claim 1, wherein each of the plurality of limiting portions has an end connected to the swing disk, and the end has a width greater than that of a portion of the limiting portion extending along the edge of the mounting portion.

7. The sample crusher according to claim 1, wherein each of the plurality of limiting portions has an end connected to the swing disk, a first connecting lug and a second connecting lug are arranged on the end, and the first connecting lug and the second connecting lug respectively extend toward two sides of the limiting portion.

8. The sample crusher according to claim 7, wherein a first connecting hole is formed in the mounting portion, a second connecting hole is formed in the first connecting lug, the first connecting hole is arranged flush with the second connecting hole in an extending direction of the limiting portion, a distance between the first connecting hole and the second connecting hole is in a range of 65-85 mm, and an included angle of 5° to 9° is formed between the axis of the bearing and the axis of the transmission shaft.

9. The sample crusher according to claim 7, wherein a first connecting hole is formed in the mounting portion, a second connecting hole is formed in the first connecting lug, the first connecting hole is arranged flush with the second connecting hole in an extending direction of the limiting portion, a distance between the first connecting hole and the second connecting hole is in a range of 80-105 mm, and an included angle of 16° to 25° is formed between the axis of the bearing and the axis of the transmission shaft.

10. The sample crusher according to claim 1, wherein the plurality of limiting portions comprise at least a first limiting portion, a second limiting portion and a third limiting portion which are all arranged at an edge of the mounting portion.

11. The sample crusher according to claim 10, wherein an included angle of 115° to 120° is formed between two adjacent limiting portions.

12. The sample crusher according to claim 1, wherein the circumferential limiting component is made of a flexible material, the swing disk is located above the electric motor, and each of the plurality of limiting portions has an end close to the mounting portion is configured to be bent upwardly and an end connected to the swing disk configured to be bent inwardly toward a side close to the swing disk.

13. The sample crusher according to claim 1, further comprising a main body upper cover, wherein a lock-catch switch is arranged between the main body upper cover and the main body housing, and is connected to a control circuit of the electric motor.

14. The sample crusher according to claim 13, wherein the lock-catch switch comprises a lock structure and a catch structure adapted to the lock structure, the lock structure is mounted on the main body housing, the catch structure is mounted on the main body upper cover at a position corresponding to the lock structure, the lock structure is provided with a first contact point in communication with the control circuit, and the catch structure is provided with a second contact point in communication with the control circuit.

15. The sample crusher according to claim 1, further comprising a main body upper cover, wherein a contact switch is arranged between the main body upper cover and the main body housing, and is in communication with a control circuit of the electric motor.

16. The sample crusher according to claim 15, wherein the contact switch is mounted on an inner side of the main body upper cover, and a trigger block is arranged in the main body housing at a position corresponding to the contact switch, or the contact switch is mounted on an inner side of the main body housing, and a trigger block is arranged in the main body upper cover at a position corresponding to the contact switch.

* * * * *